United States Patent

Almen et al.

[11] 3,892,152
[45] July 1, 1975

[54] METHOD OF REMOVING EXCESS METAL FROM CURVED SURFACES OF LONG-SIZED ARTICLES AND AN INSTALLATION TO REALIZE SAME

[76] Inventors: Iosif Abramovich Almen, ulitsa Chubarya, 9, kv. 89; Efim Elevich Krasner, ulitsa Karla Marxa, 43, kv. 42; Vladimir Izrailevich Dunaevsky, ulitsa Oktyabrskoi revoljuts 11, 27, kv. 9, all of Slavyansk; Ivan Nikitich Kireev, ulitsa Lenina 159, kv. 21, Cherepovets, all of U.S.S.R.

[22] Filed: May 16, 1974

[21] Appl. No.: 470,554

[30] Foreign Application Priority Data
May 17, 1973 U.S.S.R. ............................. 1924590
Nov. 14, 1973 U.S.S.R. ............................. 1966307

[52] U.S. Cl. .................. 83/56; 83/433; 83/490; 83/591; 83/914
[51] Int. Cl. ............................. B23d 1/00; B26d 1/12
[58] Field of Search ....... 83/56, 433, 490, 591, 914; 90/24 D, 24 F

[56] References Cited
UNITED STATES PATENTS
1,958,122  5/1934  Ambler ........................... 83/433 X
2,852,985  9/1958  Schlatter et al. .................. 90/24 D
3,377,896  4/1968  De Corta ......................... 83/914 X Primary Examiner—Willie G. Abercrombie

[57] ABSTRACT

In realizing the present method a ring-shaped tool is used with the cutting edge formed at the intersection of its inner and end surfaces, said tool is slipped over an article to be machined and positioned at an angle to the longitudinal axis of the article, the angle being selected depending on the curvature of the work surface, and then the cutting tool and the product are given a relative motion to provide for the interaction of the tool and the surface of the article being machined, such that the article moves only progressively, while the cutting tool is only rotating.

In an installation for removing production-caused excess metal from curved surfaces of long-sized articles by the present method, the tool is ring-shaped with the cutting edge at the intersection of its inner and end surfaces, means for fixing the cutting tool comprises a holder rotating together with the tool around the article in the course of machining and provided with devices for inclining the holder in relation to the longitudinal axis of the article and for fixing it in the inclined position, while the holder with the cutting tool accommodates a support for positive pressing of the article against the cutting edge of the tool, and means for relative displacement of the cutting tool and the article is represented by a device imparting to the tool and the article such relative motion that the article moves only progressively, while the cutting tool is only rotating.

7 Claims, 9 Drawing Figures

METHOD OF REMOVING EXCESS METAL FROM CURVED SURFACES OF LONG-SIZED ARTICLES AND AN INSTALLATION TO REALIZE SAME

The present invention relates to post-production machining of metal articles, particularly cold-rolled stock, and more exactly to a method of removing production-caused excess metal from curved surfaces of long-sized metal articles and an installation to realize the given method.

In the production of long-sized metal shapes, especially by cold rolling, production-caused excess metal, such as fins, burrs and other undesirable projections is usually formed on their curved surfaces. Before manufacturing parts such as automobile door hinges, turbine blades, etc. from such shapes, the excess metal should be carefully removed conforming to the contour of the basic shape surface.

With this in view, a need has arisen to provide and efficient method and means for removing fins and other production-caused excess metal from curved surfaces.

There exists a widely known method of removing production-caused excess metal from curved surfaces of long-sized metal articles and an installation to realize this method. In accordance with this method, a conventional planing tool is used which is fixed in a slide rest installed on a bed. The workpiece is brought to interact with the tool whose cutting edge is made to match the profile of the workpiece.

Machining is performed by way of relative displacement of the slide rest carrying the tool and the workpiece. Commonly, the tool is stationary, while the workpiece is displaced progressively by means of a chain drive of a type employed in draw benches.

With this method, machining of curved surfaces is hampered because the tool wears out in the course of cutting, thus changing its shape, which impairs the quality of the surface machined. Frequent tool replacement is required to fight this disadvantage, which certainly sharply reduces the efficiency of the installation.

In those cases where high quality of the machined surface is not required, fins are removed by a tool having a straight-line cutting edge, and also by circle shears. In these cases, remnants of fins in the form of protrusions and burrs are left on part of the shape machined.

To upgrade the quality of the curved surface, such articles need a secondary treatment by abrasive tools shaped to match the surface curvature.

This two-stage method of machining is of low productivity and involves a high consumption of costly abrasive tools.

An object of the present invention is to provide a method of removing production-caused excess metal from curved surfaces of long-sized metal articles with the use of such cutting tool and such relative displacement of the tool and work surface of the article which assure a high quality of the surface machined.

Another object of the present invention is to provide an installation whose structural embodiment provides for an efficient removal of production-caused excess metal from curved surfaces of long-sized metal articles.

These and other objects are achieved in such a way that in removing production-caused excess metal from curved surfaces of long-sized metal articles by means of a cutting tool interacting with the work surface in the course of their relative displacement, according to the invention, a ring-shaped cutting tool is used with the cutting edge at the intersection of its inner and end surfaces, which tool is slipped over the article being machined and installed at an angle to the longitudinal axis of the article, said angle being chosen depending on the curvature of the surface being machined, and then to provide for the interaction of the cutting tool with the work surface of the article, a relative motion is imparted thereto so that the product moves only progressively, while the cutting tool is only rotating.

In an installation for removing production-caused excess metal from curved surfaces of long-sized metal articles, comprising a cutting tool and bed-mounted means for fixing and relative displacement of the tool and the product, according to the invention, the cutting tool is ring-shaped with the cutting edge disposed at the intersection of its inner and end surfaces, the means for fixing this cutting tool incorporates a holder rotating together with the cutting tool around the article in the course of machining and provided with devices for inclining it in relation to the longitudinal axis of the article and fixing it in the inclined position, and a support is housed within the holder with the cutting tool to positively press the article against the cutting edge of the tool, while the means for effecting the relative displacement of the cutting tool and the article is of a type imparting a relative displacement to the tool and the article such that the article moves only progressively, while the cutting tool is only rotating. The means for positive pressing of the article against the cutting edge of the tool may be represented by a power cylinder.

In the installation according to the invention, the holder with the tool, the support and the power cylinder should preferably be enclosed in a housing installed on the bed in floating-type bearing supports and adapted to be freely displaced in the direction of the axis of inclination of the holder.

The support may take the form of a roller whose axle is positioned on a frame pivotally mounted in the housing and connected with the rod of the power cylinder, whereas the roller may have in its side surface a circular groove whose profile corresponds to that of the portion of the article resting on said roller.

It is convenient to mount the roller on the frame so that the former could be displaced along the axis of rotation thereof.

Apart from that, the cutting tool may be so constructed that the inner surface of the ring constitutes part of the surface of a bambinoid of revolution.

The essence of the instant invention is as follows.

In the course of machining, the cutting edge of the tool slipped over the article and inclined to its longitudinal axis circumscribes an ellipse on the surface of the article being machined, as projected on the longitudinal axis thereof, whose curvature at the point of machining equals or closely approximates the curvature of the surface of the article under work.

Due to the progressive motion of the article and the rotary motion of the cutting tool in the course of their interaction, fins protruding beyond the basic profile are cut off by the cutting edge along the curved surface.

The long length of the continuous cutting edge of the rotating tool as compared with a conventional planing tool makes it highly durable, and even an increase in diameter of the cutting edge circumference caused by tool wear in the present method in no way affects the radius of curvature of the work surface, thereby providing for the high quality of the product's surface.

The structural embodiment of an installation with a ring-shaped tool installed in a rotating holder permits continuous removal of fins in the course of relative displacement of the tool and the article.

The device for inclining the holder with the tool and fixing the holder in the given position, employed in the proposed installation, allows one and the same tool to be used for removing fins from surfaces differing in curvature by varying the angle of inclination, which broadens the range of articles which can be machined by the installation.

The ring-shaped cutting tool with the inner surface shaped as that of a bambinoid, employed in the proposed installation, allows the article to be inserted through the opening of the ring inclined to the article axis; it also provides for the maximum strength of the tool cutting edge.

This is due to the fact that the such inner surface of the ring maximally approximating in shape to the surface of the article being machined never intersects it.

Assuming that the maximum approximation of these surfaces is certain line of contact, and the curved profile being worked is a circular cylinder of a radius equal to the radius of curvature of the actual profile in the work zone, the inner surface of the ring may be represented as the surface of revolution of a meridional curve in a parametric form expressed by the following equations $$X_R = [R_K - R_u(1 - \sin\phi)]/\sin\phi \sqrt{1 - \cos^2\phi \cdot \cos^2\alpha}$$
$$Y_e = (R_K - R_u)(\sin^2\alpha/\cos\alpha)ctg\phi - R_u \cdot \cos\alpha \cdot \cos\phi$$

where $X_R$ and $Y_1$ are current coordinates of the curve; the origin of coordinates is a geometric centre of the throat circumference. The direction of the $y$ axis coinciding with the imaginary axis of the throad is the axis of revolution of the curve while the $x$ axis lies in the throat plane, $R_k$ is the minimum distance from a point on the curve to the axis of its revolution (throat radius), $R_u$ is the radius of curvature of the article being machined at the point of contact between the tool and the product, $\alpha$ is the angle of tool inclination to the longitudinal axis of the article being machined, $\phi$ is a curve parameter (given in parametric form) of the section of the surface being machined at the point of contact with the ring inner surface.

The surface formed by the revolution of the above curve is the surface of revolution of a second-order curve known as bambinoidal.

As the radius of curvature of the article being machined decreases this surface approximates the shape of the surface of a hyperboloid of one sheet. For better understanding, the inner surface of the tool may be assumed as being the surface of a hyperboloid of one sheet, while the cutting edge as being a line lying at the intersection of this surface with the hyperboloid throat surface, the angle of intersection of these surfaces being equal to 90°.

Due to the structural embodiment of the proposed installation, in which the holder with the tool, the support and the power cylinder are inclosed in a housing installed on the bed in floating-type bearing supports, it becomes possible to remove fin simultaneously at several points of the article having a crescent-shaped deviation from rectilinearity, by means of a number of installations positioned in succession, one after another.

As a crescent-shaped strip passes through the installation, the housing is displaced, due to the floating supports, by a value determined by the curvature of the crescent without disturbing the fin removing process, because no change takes place either in the angle of inclination of the holder with the tool toward the longitudinal axis of the article or in the value of the force pressing the article against the cutting edge of the tool, the two decisive parameters of the machining process.

The fact that the support is constructed as a roller having in its side surface a circular groove whose profile corresponds to the profile of the portion of the article resting on the roller makes it possible to maintain a fixed position of the article in the course of machining, while the ability of this roller to move along the axis of its rotation enables the article's position to be varied during machining.

In order to make the present invention more readily understood, the description is accompanied with drawings bringing more light to the instant method of machining of curved surfaces of long-sized metal articles, as well as with drawings illustrating an actual embodiment of an installation to realize the above method, in which.

Figure 1:
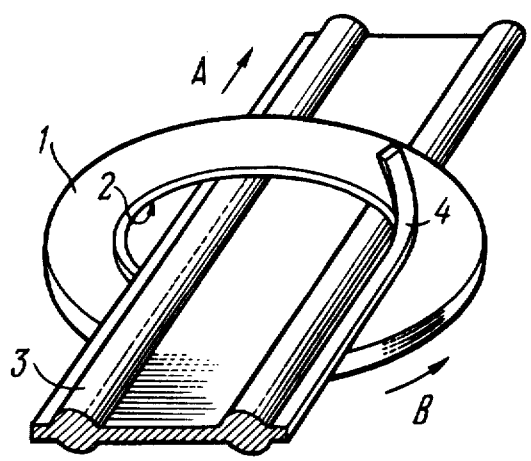
FIG. 1 is a general view of a cutting tool and an article in the course of their interaction.
Figure 2:
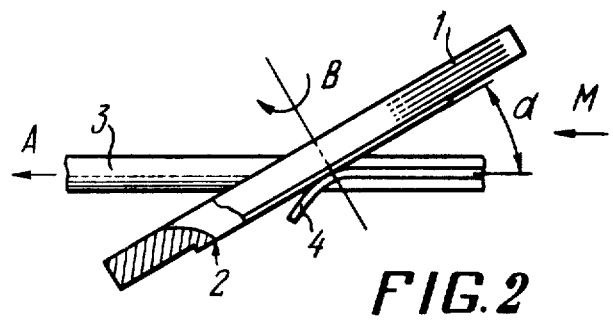
FIG. 2 is a side view of the same, partly broken.

The present method of removing production-caused excess metal from curved surfaces of long-sized metal products is put into effect by means of a ring-shaped cutting tool 1 (FIG. 1) with a cutting edge 2 at the intersection of its inner and end surfaces. The article to be machined is positioned inside the tool which is installed at an angle $\alpha$ (FIG. 2) to the longitudinal axis of the article to be machined indicated at 3 such that the circumference of the cutting edge as projected on the longitudinal axis of the article 3 forms an ellipse whose curvature at the point of machining coincides with or closely approximates to the curvature of the surface being machined.

Figure 4:
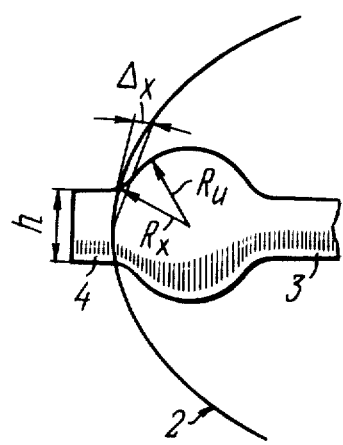
FIG. 4 is a schematic of relative positioning of the cutting edge and the product being machined.

The article 3 is given a progressive motion (as indicated by arrow A), while the cutting tool 1 is given a rotary motion (in the direction of arrow B) and, in the course of their interaction, excess metal 4 (FIG. 4) protruding beyond the cutting edge 2 is cut off. Due to the use of the tool 1 with its continuous cutting edge 2, the excess metal is continuously removed from the progressively moving article, thus assuring a high efficiency of the process.

The cutting edge diameter of the tool 1 and the angle $\alpha$ of its inclination to the longitudinal axis of the article being machined are inter-related and depend on the curvature of the article's surface.

The cutting edge diameter of the tool is so selected that the angle $\alpha$ depending on the curvature of the surface machined is set within the limits of 5°—20°, resulting in a stable interaction of the tool and the article being machined.

Figure 3:
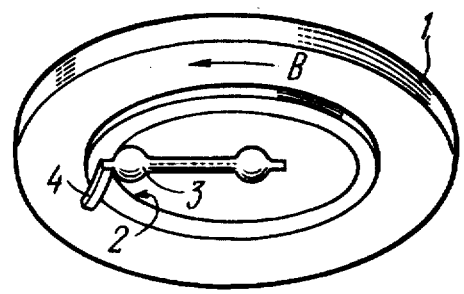
FIG. 3 is a view of the same, taken along the arrow M of FIG. 2.

The following is an actual example of removing excess metal from a shaped rolled section of an automobile door hinge blank with excess metal or fin, 3 mm deep and up to 5 mm wide, located on a cylindrical surface of radius 7 mm. The diameter of the tool 1 (FIGS. 1, 3) is equal to 300 mm. The tool is positioned at an angle $\alpha$ (FIG. 2) equal to 13°59'. The value of difference $\Delta X$ (FIG. 4) between the radius $R_x$ of the actual surface being machined and the radius $R_u$ of the given cylindrical surface equal to 7 mm with fin depth of $h = 3$ mm is $\Delta X = 0.0015$ mm. The above example illustrates an exceptionally high accuracy of machining by the present method because here the disagreement of these radii is approximately two orders of magnitude less than the sectional tolerance for the article being machined.

Figure 5:
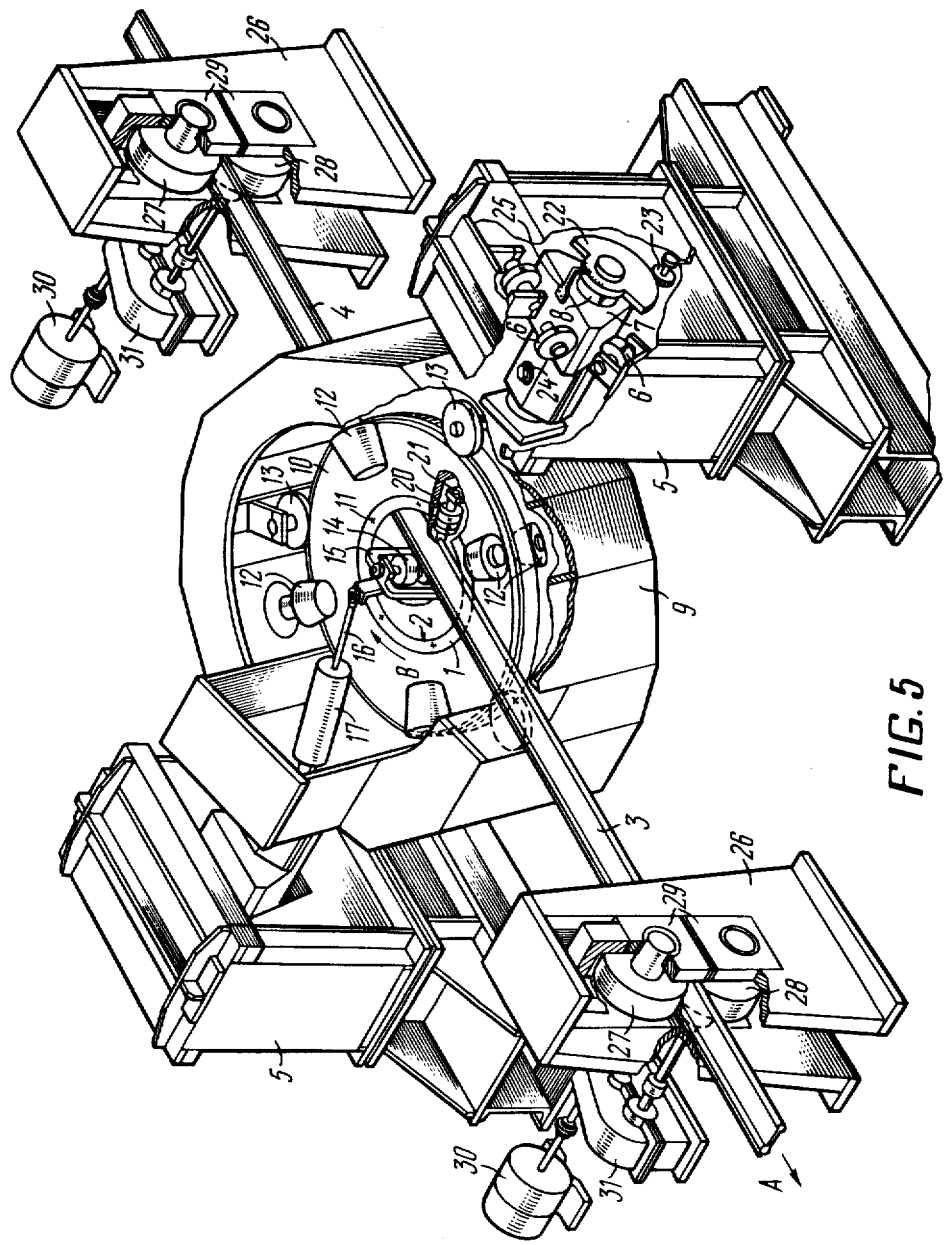
FIG. 5 is a general view, partly broken, of an installation for removing fins from the curved surface of rolled sections, wherein the rolled article is displaced in the course of its machining by means of a drawing device.
Figure 6:
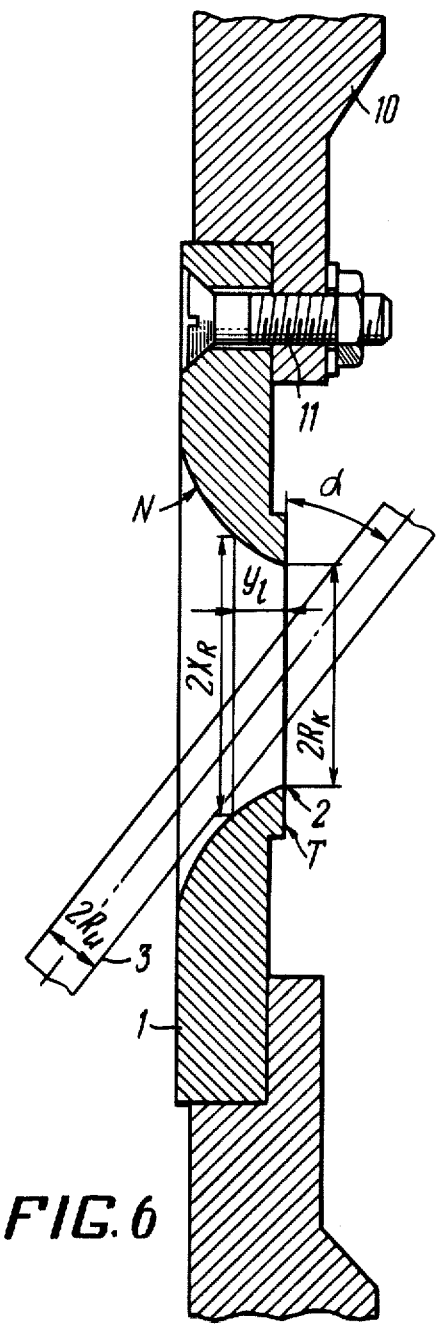
FIG. 6 is a sectional view of a tool with a holder, taken along a plane passing through the central axis of the tool.

An installation for removing excess metal from curved surfaces comprises a bed 5 (FIG. 5), floating-type bearing supports in the form of rollers 6 and knife-edges 7 mounted on the bed, journals 8 of a housing 9 which are inserted in said supports, and a holder 10 with the tool 1 fixed therein, said holder being rotatably disposed within said housing. The tool 1 is secured to the holder by means of bolts 11 (FIG. 6). The tool is made in the form of a ring with the cutting edge 2 positioned at the intersection of its inner surface N and end surface T. For unobstructed passage of the article in the course of machining through the angularly positioned tool and for improving the tool strength in the cutting edge zone, the inner surface of the ring represents a portion of the surface of a bambinoid of revolution.

Figure 7:
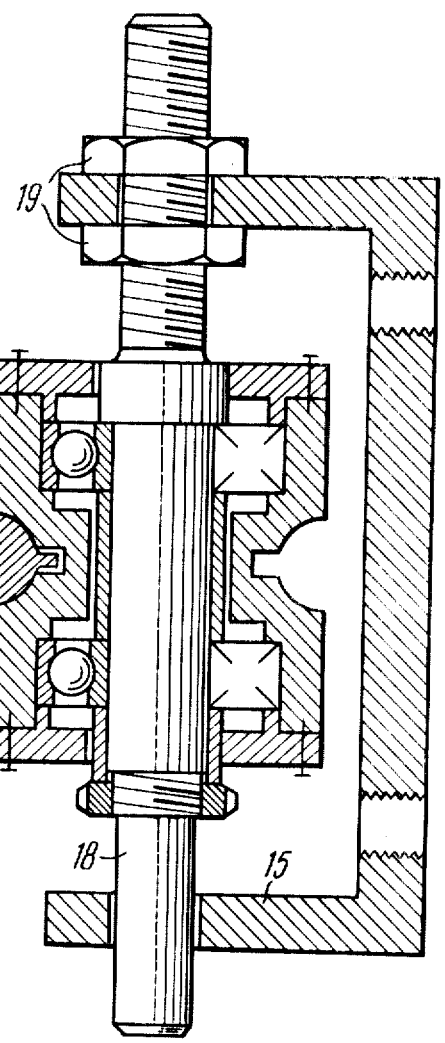
FIG. 7 is a longitudinal sectional view of a roller support of the installation according to the invention.

The holder 10 is held in the housing 9 by means of tapered rollers 12 (FIG. 5) to prevent its vertical displacement and cylindrical rollers 13 to prevent its horizontal displacement. A support in the form of a roller 14 is installed inside the tool. This roller support 14 is fixed on a frame 15 whereof the lower portion is pivotally mounted in the housing 9, while the upper portion is connected to a rod 16 of a power cylinder 17 which drives the support 14 for pressing the article against the cutting edge 2 of the tool. The support 14 as well as the power cylinder 17 are likewise enclosed in the housing 9. The roller support 14 is mounted on the frame 15 by an axle 18 (FIG. 7). To permit displacement of the support 14 along its axis of rotation, as shown by arrows C and D, one end of the axle 18 is threaded so that the axle 18 together with the roller support 14 can be displaced in relation to the frame 15 by means of nuts 19. A supporting roller 20 (FIG. 5) is mounted below the tool 1 and fixed on an upright 21 built into the housing 9.

In order to incline the holder 10 with the tool in relation to the longitudinal axis of the product 3, one of the journals 8 mounts a quadrant 22 with graduations marked thereon, and a pinion 23 is provided to mesh with the quadrant 22, the pinion supports resting on the knife-edge 7.

The deflection angle of the housing with holder and tool is fixed by means of a bolt 24 which clamps the journal 8 in the knife-edge 7. The knife-edge 7 also mounts an indicator 25 to show the deflection angle of the quadrant 22.

Mounted separately on either side of the housing 9 and close thereto are drawing devices, each comprising an upper idle roller 27 and a lower driven roller 28, both mounted in pads 29 and fixed on a bearing frame 26. The driven rollers 28 of the drawing devices are rotated by electric motors 30 through reducers 31.

Figure 8:
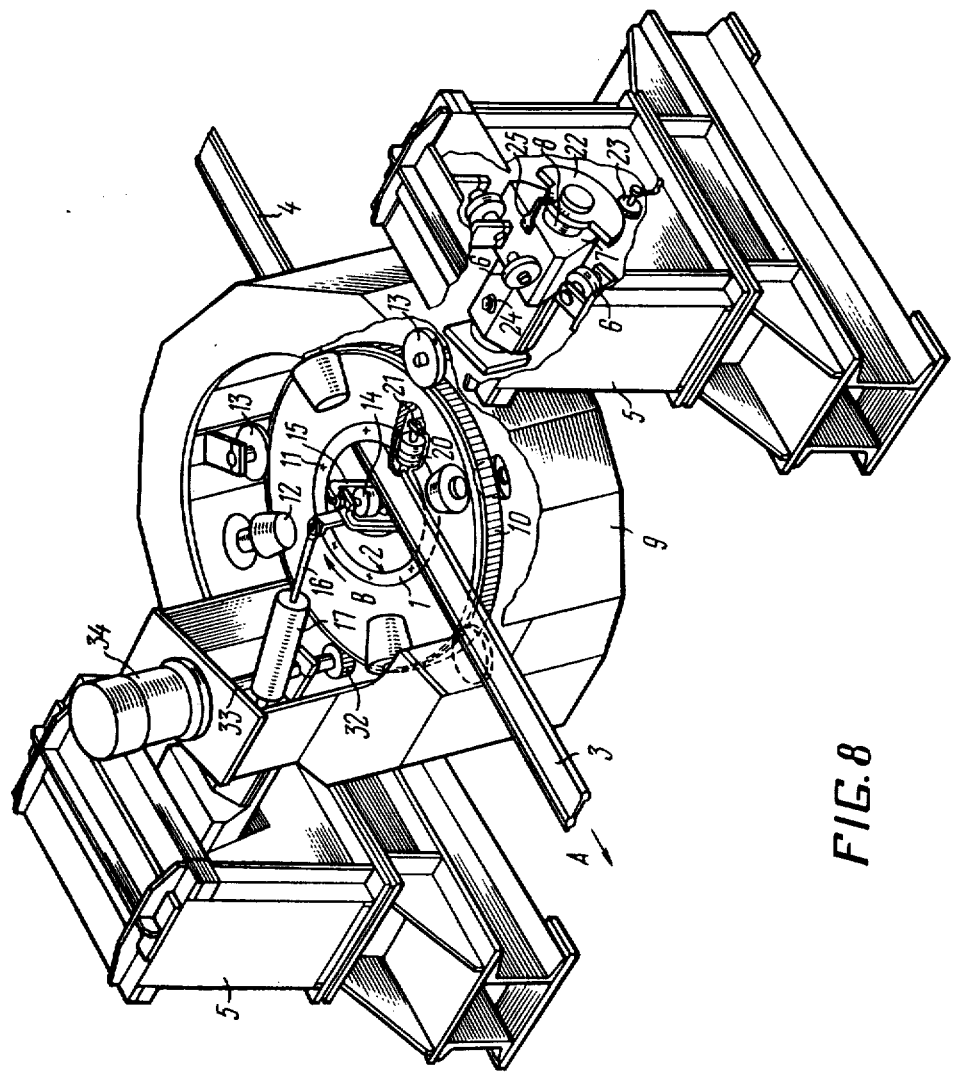
FIG. 8 is a general view, partly broken, of an installation for removing fins from the curved surface of rolled sections, equipped with a device for rotating the holder with the tool.

A structural embodiment of the installation with a tool rotating power drive is illustrated in FIG. 8. In this installation, the side surface of the holder 10 is toothed and meshes a pinion 32 which is rotated by a hydraulic motor 34 through a shaft 33. In all other respects this installation is similar to the one described above.

Figure 9:
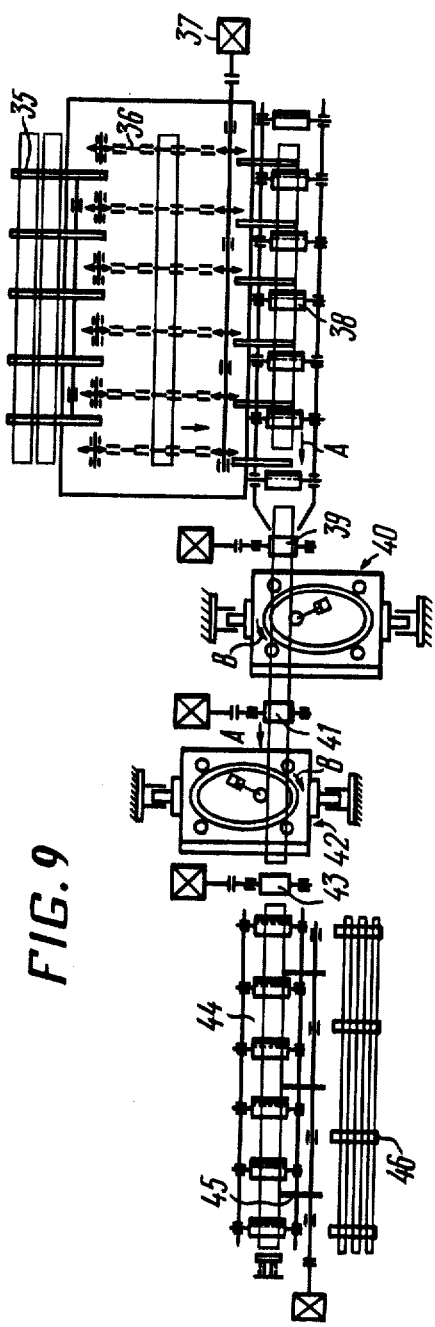
FIG. 9 is a plan schematic layout of a production line for removing fins from the curved surface of rolled sections.

Operation is now described of the instant installation in a process line for removing excess metal from the curved surface of shaped sections of blanks for producing automobile door hinges. Shaped section strips are placed on a receiving rack 35 (FIG. 9) wherefrom by means of a chain conveyor 36 powered by a drive 37 they are singly conveyed to a roller bed 38 to be fed to a drawing device 39. The forward end of the strip is gripped by the rollers of the drawing device 39 and delivered to a first installation 40 for removing production-caused excess metal from the curved surface on one side of the shaped metal section.

Before starting the installation, the required angle of inclination of the tool 1 in relation to the longitudinal axis of the strip 3 to be machined is set by turning the quadrant 22 (FIG. 5) with the help of the pinion 23 and then fixed by means of the bolt 24. When the forward end of the strip 3 passes between the roller support 14 and the cutting edge 2 of the tool 1, the power cylinder 17 is automatically actuated to press the strip by means of the roller support 14 against the cutting edge 2 of the tool 1.

The required positioning of the strip 3 in the course of machining is effected by displacing the roller support 14 along its axis of rotation, the support carrying the portion of the strip section opposite to that which is being machined.

With further progressive movement of the strip 3 in the direction indicated by arrow A its interaction with the tool 1 sets the latter together with the holder 10 in rotary motion which results in the removal of excess metal from one side of the metal section. After the forward end of the strip leaves the installation 40 (FIG. 9), the strip is gripped by the second drawing device 41 which operates after the rear end of the strip leaves the first drawing device 39 to deliver the strip to a second installation 42, similar to the first one, for machining the other side of the metal section.

When the rear end of the strip leaves the installation 40, the roller support 14 (FIG. 5) is moved away from the cutting edge of the tool by means of the power cylinder 17 and the installation is ready for machining the next strip.

The strip 3 upon passing through both installations 40 and 42 is gripped by a third successive drawing device 43 and transfer thereby to a load-out roller bed 44 wherefrom it is discharged into a tray 46 by means of a kicker 45.

A bunch of products weighing 3–5 tons thus piled up on the tray 46 is tied up and transferred by crane to the shipment bay.

The speed of progressive motion of the strip in the course of machining along the process line described reaches 1 m/s, while its productive capacity is up to 20 t/hr, but these ratings are not limiting ones because the present method and installations afford article speeds of to 3 m/s and even higher.

Operation will be described now of an installation wherein the means for relative displacement of the tool and the product is represented by a device for rotating the holder with the tool.

Just as in the example described above, the article is delivered to the installation and pressed by the roller support 14 (FIG. 8) against the cutting edge 2 of the tool 1. Rotation of the tool 1 with the holder 10 by means of the pinion 32 is effected from the hydraulic motor 34. Due to the interaction of the cutting edge of the rotating tool with the article being machined the latter receives a progressive motion in the course of which excess metal is removed from one side of the metal section.

For machining articles with excess metal on both sides of the metal section, another installation is mounted in succession where excess metal is removed in the same way. After the rear end of the product leaves the installation, it is transported and handled as described hereinabove.

As it may be seen from the description, the present method and installation for removing production-caused excess metal from curved surfaces of long-sized metal articles provided for a high profile accuracy at a high process efficiency.

We claim:

1. A method of removing production-caused excess metal from curved surfaces of long-sized metal articles, consisting in that a ring-shaped tool with a cutting edge at the intersection of the inner and end surfaces thereof is slipped over an article to be machined and positioned at an angle to the longitudinal axis of said product, and then a relative displacement is imparted to said cutting tool and said article to provide for the interaction of the cutting tool and the work surface, such that the article moves only progressively, while the cutting tool is only rotating, the angle of inclination of said cutting tool to the longitudinal axis of said product being selected depending on the curvature of the surface being machined.

2. An installation for removing production-caused excess metal from curved surfaces of long-sized metal articles, comprising: a bed; a ring-shaped tool with a cutting edge at the intersection of the inner and end surfaces thereof; means in the form of a holder mounted on said bed for fixing the cutting tool, said holder rotating together with the cutting tool around the article being trimmed; means for inclining said holder together with said cutting tool in relation to the longitudinal axis of the article; means for fixing said holder in the inclined position; a support disposed inside said holder for positive pressing of the article against the cutting edge of the tool, a means for positive pressing of the article against the cutting edge of the tool; means for relative displacement of said cutting tool and article such that the article moves only progressively, while the tool is only rotating.

3. An installation as set forth in claim 2, wherein the means for positive pressing of the article against the cutting edge of the tool is represented by a power cylinder.

4. An installation as set forth in claim 3, wherein said holder with the cutting tool, as well as the support and the power cylinder are inclosed in a housing mounted on the bed in floating-type bearing supports enabling said housing to be freely displaced in the direction of the axis of inclination of said holder.

5. An installation as set forth in claim 3, wherein said support is made in the form of a roller whereof the axle is disposed on a frame pivotally mounted in the housing and connected to the rod of the power cylinder, and the roller has in the side surface thereof a circular groove of a profile corresponding to the profile of the portion of the article resting on said roller.

6. An installation as set forth in claim 5, wherein the roller is mounted on the frame so as to be able to move along the axis of rotation thereof.

7. An installation as set forth in claim 2, wherein the inner surface of the ring-shaped cutting tool constitutes part of the surface of a bambinoid of revolution.

* * * * *